(12) United States Patent
Kawashima et al.

(10) Patent No.: US 8,799,823 B2
(45) Date of Patent: Aug. 5, 2014

(54) DISPLAY DEVICE

(75) Inventors: Tsuyoshi Kawashima, Nagoya (JP); Daisuke Kasamatsu, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 255 days.

(21) Appl. No.: 12/710,774

(22) Filed: Feb. 23, 2010

(65) Prior Publication Data

US 2010/0218143 A1 Aug. 26, 2010

(30) Foreign Application Priority Data

Feb. 26, 2009 (JP) ................. 2009-044364
Mar. 3, 2009 (JP) ................. 2009-049378
Mar. 27, 2009 (JP) ................. 2009-079462

(51) Int. Cl.
*G06F 3/048* (2013.01)

(52) U.S. Cl.
USPC ........... 715/854; 715/818; 715/819; 715/821; 715/851; 715/853; 715/855

(58) Field of Classification Search
USPC ................................. 715/823, 854
See application file for complete search history.

(56) References Cited

U.S. PATENT DOCUMENTS

| | | | |
|---|---|---|---|
| 6,381,611 | B1 | 4/2002 | Roberge et al. |
| 7,240,292 | B2 | 7/2007 | Hally et al. |

(Continued)

FOREIGN PATENT DOCUMENTS

| | | | |
|---|---|---|---|
| CN | 1538301 A | 10/2004 | |
| CN | 1573745 A | 2/2005 | |

(Continued)

OTHER PUBLICATIONS

Office Action dated Sep. 6, 2012 received from the Chinese Patent Office from related Chinese Application No. 201010126461.5, together with an English-language translation.

(Continued)

*Primary Examiner* — Omar Abdul-Ali
*Assistant Examiner* — Sherrod Keaton
(74) *Attorney, Agent, or Firm* — Scully, Scott, Murphy & Presser, PC

(57) ABSTRACT

A display device includes a display unit, a first display control unit, a title string storing unit, a concatenated string creating unit, a determining unit, a navigation string creating unit, and a second display control unit. The display unit includes a first portion and a second portion. The first display control unit is configured to display one of a plurality of screen images on the first portion. The plurality of screen images includes a base screen image. The first display control unit changes a screen image to display from one to another of the plurality of screen images along a screen navigation path starting from the base screen image. The title string storing unit is configured to store a plurality of title strings. Each title string indicating one of the plurality of screen images. The concatenated string creating unit is configured to create a concatenated string including the title strings each corresponding to a screen image which is positioned in a part of the screen navigation path from the base screen image to a current screen image that is displayed on the first portion currently. The determining unit is configured to determine whether or not the concatenated string is too large to be displayed entirely on the second portion. The navigation string creating unit is configured to create a navigation string by deleting an at least one of the title strings from the concatenated string when the determining unit determines that the concatenated string is too large to be displayed entirely on the second portion. The second display control unit is configured to display the navigation string on the second portion.

9 Claims, 12 Drawing Sheets

(56) References Cited

U.S. PATENT DOCUMENTS

| | | | |
|---|---|---|---|
| 7,275,204 B2* | 9/2007 | Anders et al. | 714/795 |
| 7,275,207 B2* | 9/2007 | Aureglia et al. | 715/214 |
| 7,421,664 B2* | 9/2008 | Wattenberg et al. | 715/823 |
| 7,853,890 B2 | 12/2010 | Miner et al. | |
| 7,899,830 B2 | 3/2011 | Komano et al. | |
| 2003/0197738 A1* | 10/2003 | Beit-Zuri et al. | 345/786 |
| 2003/0218641 A1 | 11/2003 | Longobardi | |
| 2004/0153446 A1 | 8/2004 | Castronova | |
| 2004/0207666 A1* | 10/2004 | Hally et al. | 345/854 |
| 2004/0233238 A1 | 11/2004 | Lahdesmaki | |
| 2004/0250219 A1 | 12/2004 | Sawada | |
| 2005/0027408 A1 | 2/2005 | Donoghue et al. | |
| 2005/0131945 A1 | 6/2005 | Muller et al. | |
| 2005/0234979 A1* | 10/2005 | Martineau et al. | 707/103 X |
| 2005/0246648 A1 | 11/2005 | Miner et al. | |
| 2006/0123361 A1* | 6/2006 | Sorin et al. | 715/854 |
| 2006/0171682 A1 | 8/2006 | Komano et al. | |
| 2007/0016870 A1 | 1/2007 | Doerr et al. | |
| 2007/0168886 A1 | 7/2007 | Hally et al. | |
| 2008/0184171 A1 | 7/2008 | Sato et al. | |
| 2008/0303823 A1 | 12/2008 | Yanagawa | |
| 2009/0063547 A1* | 3/2009 | Wright et al. | 707/102 |
| 2010/0218143 A1 | 8/2010 | Kawashima et al. | |
| 2011/0083097 A1 | 4/2011 | Miner et al. | |
| 2011/0264674 A1 | 10/2011 | Yanagawa | |

FOREIGN PATENT DOCUMENTS

| | | |
|---|---|---|
| CN | 101223495 A | 7/2008 |
| JP | 9-269883 | 10/1997 |
| JP | 2001-265477 | 9/2001 |
| JP | 2002-007104 | 1/2002 |
| JP | 2002-335465 | 11/2002 |
| JP | 2004-362141 A | 12/2004 |
| JP | 2006-196058 | 7/2006 |
| JP | 2006-236142 | 9/2006 |
| JP | 2006-270512 | 10/2006 |
| JP | 2007-034647 | 2/2007 |
| JP | 2007-232920 | 9/2007 |
| JP | 2008-158796 | 7/2008 |
| JP | 2008-158884 | 7/2008 |
| JP | 2008-191728 A | 8/2008 |
| JP | 2008-217599 | 9/2008 |
| JP | 2008-292552 | 12/2008 |
| JP | 2010-204925 A | 9/2010 |
| JP | 2010-218204 | 9/2010 |
| JP | 2010-219884 A | 9/2010 |
| JP | 2010-225145 A | 10/2010 |
| JP | 2010-231588 A | 10/2010 |
| JP | 2010-244527 | 10/2010 |

OTHER PUBLICATIONS

U.S. Office Action dated Sep. 18, 2012 from related U.S. Appl. No. 12/725,783.

Japanese Official Action dated Dec. 6, 2011 together with an English language translation from JP No. 2010041718 of basic Japanese Patent application No. 2009-044364.

Decision of Dismissal of Amendment dated Dec. 6, 2011 from related Japanese Patent Application 2009-064079 of corresponding U.S. Appl. No. 12/725,783.

Office Action dated Mar. 14, 2013 received from related U.S. Appl. No. 12/725,783.

Office Action dated Feb. 24, 2012 received from the Chinese Patent Office from related Chinese Application No. 201010126461.5, together with an English-language translation.

Notice of Allowance dated Mar. 13, 2012 received from the Japanese Patent Office from related Japanese Application No. 2010-041718, together with an English-language translation.

Japanese Office Action dated Nov. 24, 2010 together with partial English translation from related U.S. Appl. No. 12/725,783.

* cited by examiner

FIG.2

| HIERARCHICAL LEVEL | 1 | | 2 | | 3 | | 4 | | 5 | |
|---|---|---|---|---|---|---|---|---|---|---|
| TITLE | MENU | | GENERAL SETUP | | MODE TIMER | | | | | |
| ID | | ID00 | | ID10 | PAPER TYPE | ID11 | | | | |
| | | | | | PAPER SIZE | ID12 | | | | |
| | | | | | VOLUME | ID13 | | | | |
| | | | | | | ID14 | | | | |
| | | | NETWORK | ID90 | LAN | ID91 | TCP/IP | ID93 | IP ADDRESS | ID94 |
| | | | | | | | | | SUBNET MASK | ID95 |
| | | | | | | | | | GATEWAY | ID96 |
| | | | | | FACTORY RESET | ID92 | | | | |

12b

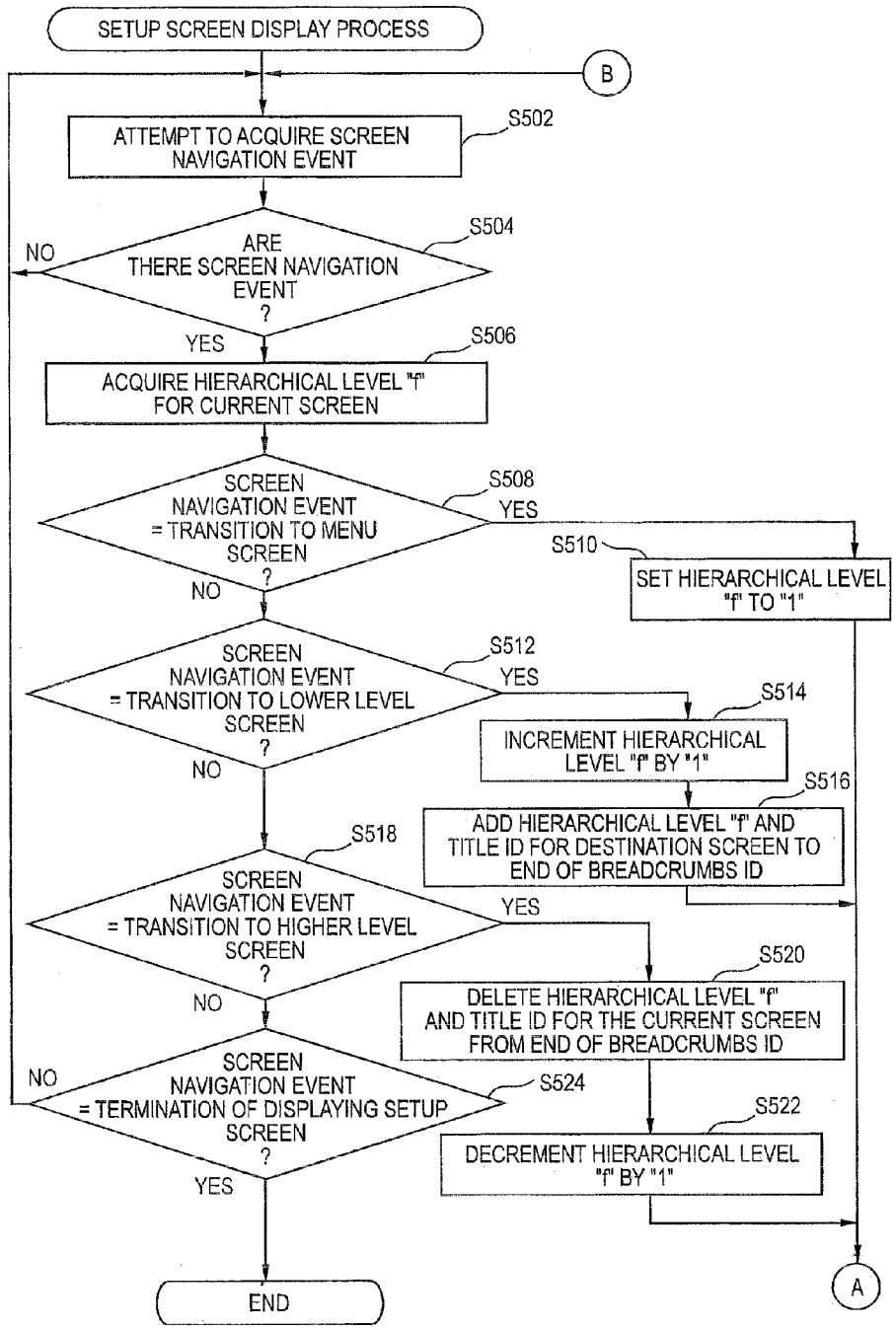

FIG. 10

| HIERARCHICAL LEVEL | 1 | | 2 | | 3 | | | 4 | | | 5 | | |
|---|---|---|---|---|---|---|---|---|---|---|---|---|---|
| | TITLE | ID | PRIORITY | | | | | | | | | | |
| | MENU | ID00 | 2 | | | | | | | | | | |
| | | | GENERAL SETUP | ID10 | 2 | MODE TIMER | ID11 | 1 | | | | | |
| | | | | | | PAPER TYPE | ID12 | 1 | | | | | |
| | | | | | | PAPER SIZE | ID13 | 1 | | | | | |
| | | | | | | VOLUME | ID14 | 1 | | | | | |
| | | | NETWORK | ID90 | 2 | WIRED LAN | ID91 | 1 | TCP/IP | ID92 | 2 | IP ADDRESS | ID93 | 1 |
| | | | | | | | | | | | | SUBNET MASK | ID94 | 1 |
| | | | | | | | | | | | | GATEWAY | ID95 | 1 |
| | | | | | | WLAN | ID96 | 2 | SSID | ID97 | 1 | <NEWSSID> | ID98 | 1 |
| | | | | | | RESET FACTORY | ID99 | 1 | | | | | | |

212b

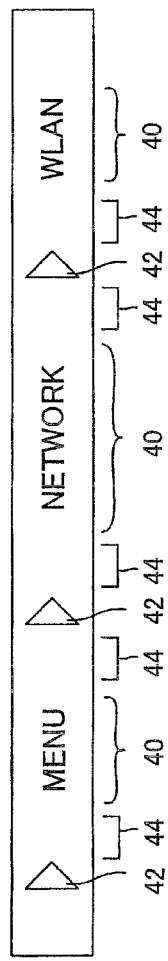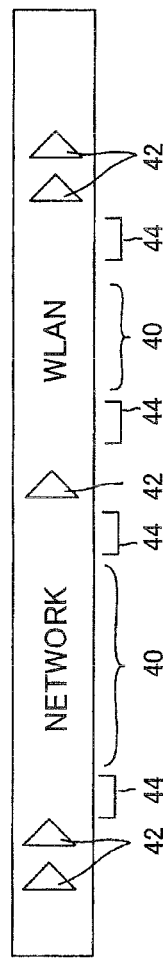

DISPLAY DEVICE

CROSS REFERENCE TO RELATED APPLICATION

This application claims priority from Japanese Patent Application No. 2009-044364 filed Feb. 26, 2009, Japanese Patent Application No. 2009-049378 filed Mar. 3, 2009, and Japanese Patent Application No. 2009-079462 filed Mar. 27, 2009. The entire content of each of these priority applications is incorporated herein by reference.

TECHNICAL FIELD

The present invention relates to a display device.

BACKGROUND

A multifunction peripheral is well known in the art as a single device capable of implementing a plurality of functions, such as a facsimile function, printer function, scanner function, and copier function. The multifunction peripheral allows a user to modify various setting items, such as resolution, density, and zoom percentage. The user can execute a desired operation on the multifunction peripheral after modifying the setting values as desired.

For example, the user may follow the procedure below to modify setting values for the multifunction peripheral. First, the multifunction peripheral displays a setup menu screen in a display panel provided on the multifunction peripheral. The menu screen includes various choices for each function of the multifunction peripheral, such as facsimile setup and scanner setup, as well as a general setup selection. When the user selects one of the choices listed in the menu, the multifunction peripheral changes the display on the display panel to a list of setting items related to the selected function.

When the user selects one of the setting items from the displayed list, the multifunction peripheral changes the display on the display panel to a modification screen in which the user can modify the value assigned to the setting item. While the modification screen is displayed, the user may input or modify the value assigned to the setting item as desired.

As the user performs operations to navigate through the prepared screens in this way, data indicating the path that the user has taken to arrive at the current screen may also be displayed in the display panel together with the current screen. One conventional format for displaying this path is called "breadcrumbs."

Breadcrumbs (or "breadcrumb trail") is a format for displaying the name of each screen that the user has navigated through to arrive at the current screen in the order displayed, such as in the example "Menu screen>Facsimile setup>Resolution." Through the breadcrumbs displayed with each screen, the user can determine to which function and to which setting item the current screen is related.

SUMMARY

However, in many cases the multifunction peripheral is provided with a liquid crystal display or the like having a limited display area. Therefore, when the character string constituting the breadcrumbs becomes long, it is impossible to display the entire text from beginning to end and, thus, the multifunction peripheral cannot adequately present this information to the user.

In view of the foregoing, it is an object of the present invention to provide a display device capable of displaying useful information by which the user can determine the navigation path followed to the current screen.

In order to attain the above and other objects, the invention provides a display device including a display unit, a first display control unit, a title string storing unit, a concatenated string creating unit, a determining unit, a navigation string creating unit, and a second display control unit. The display unit includes a first portion and a second portion. The first display control unit is configured to display one of a plurality of screen images on the first portion. The plurality of screen images includes a base screen image. The first display control unit changes a screen image to display from one to another of the plurality of screen images along a screen navigation path starting from the base screen image. The title string storing unit is configured to store a plurality of title strings. Each title string indicating one of the plurality of screen images. The concatenated string creating unit is configured to create a concatenated string including the title strings each corresponding to a screen image which is positioned in a part of the screen navigation path from the base screen image to a current screen image that is displayed on the first portion currently. The determining unit is configured to determine whether or not the concatenated string is too large to be displayed entirely on the second portion. The navigation string creating unit is configured to create a navigation string by deleting an at least one of the title strings from the concatenated string when the determining unit determines that the concatenated string is too large to be displayed entirely on the second portion. The second display control unit is configured to display the navigation string on the second portion.

According to another aspect, the present invention provides a method comprising: displaying one of a plurality of screen images on a first portion of a display unit, the plurality of screen images including a base screen image, the display unit including the first portion and a second portion; changing a screen image to display from one to another of a plurality of screen images along a screen navigation path starting from the base screen image; creating a concatenated string including title strings each corresponding to a screen image which is positioned in a part of the screen navigation path from the base screen image to a current screen image that is displayed on the first portion currently, each title string indicating one of the plurality of screen images; determining whether or not the concatenated string is too large to be displayed entirely on the second portion; creating a navigation string by deleting an at least one of the title strings from the concatenated string when the determining step determines that the concatenated string is too large to be displayed entirely on the second portion; and displaying the navigation string on the second portion.

According to another aspect, the present invention provides a computer-readable recording medium that stores a display control program, the display control program comprising instructions for: displaying one of a plurality of screen images on a first portion of a display unit, the plurality of screen images including a base screen image, the display unit including the first portion and a second portion;

changing a screen image to display from one to another of a plurality of screen images along a screen navigation path starting from the base screen image; creating a concatenated string including title strings each corresponding to a screen image which is positioned in a part of the screen navigation path from the base screen image to a current screen image that is displayed on the first portion currently, each title string indicating one of the plurality of screen images; determining whether or not the concatenated string is too large to be displayed entirely on the second portion; creating a navigation string by deleting an at least one of the title strings from the concatenated string when the determining step determines that the concatenated string is too large to be displayed entirely on the second portion; and displaying the navigation string on the second portion.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing a configuration of screen management table stored in the display device;

FIGS. 5 and 6 are flowcharts illustrating steps in a setup screen display process executed by the display device;

FIG. 10 is an explanatory diagram showing a configuration of screen management table stored in a display device according to a third embodiment;

FIG. 11A is an explanatory diagram showing a navigation string that is displayed on the display unit provided on the display device according to the third embodiment when a concatenated string is small enough to be displayed on the display unit;

FIG. 11B is an explanatory diagram showing a navigation string that is displayed on the display unit provided on the display device according to the third embodiment when a concatenated string is too larger to be displayed on the display unit.

DETAILED DESCRIPTION

Figure 1:
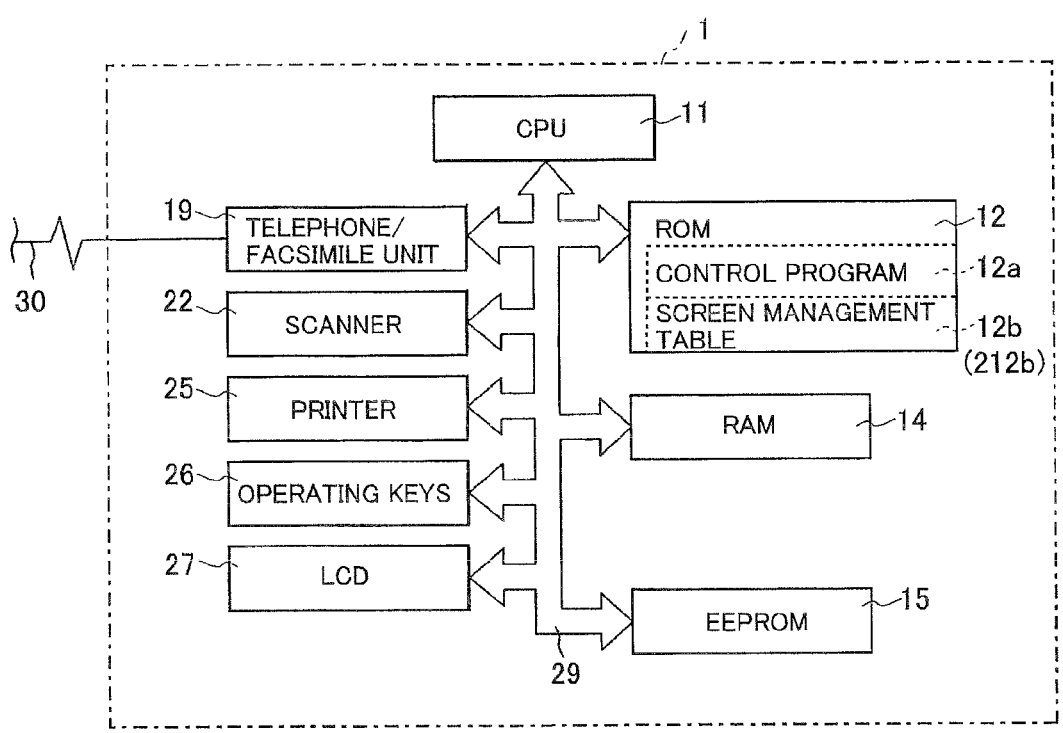
FIG. 1 is a block diagram showing an electrical structure of a display device according to a first embodiment of the invention.

Next, a first embodiment of the present invention will be described while referring to FIGS. 1 through 7 wherein like parts and components are designated by the same reference numerals to avoid duplicating description. FIG. 1 is a block diagram showing the external structure of a multifunction peripheral (hereinafter abbreviated to "MFP") 1.

The MFP 1 is a multifunction peripheral having multiple functions, including a facsimile function and printer function. The MFP 1 also allows the user to modify various setting items defining operating conditions and the like for each function. The MFP 1 can display one of a plurality of prepared setup screens that allow the user to modify values for each setting item. The setup screens are displayed on a liquid crystal display (LCD) 27 in sequences following predetermined screen navigation paths. As will be described later in greater detail, the MFP 1 can display useful information on the LCD 27 by which the user can recognize the sequence of screens through which the user has navigated to arrive at the current screen.

The MFP 1 is provided with a CPU 11, a ROM 12, a RAM 14, a EEPROM 15, a telephone/fax unit 19, a scanner 22, a printer 25, operating keys 26, and the LCD 27, all of which components are interconnected via a bus line 29. The MFP 1 includes other components, such as an interface for connecting to a personal computer or LAN, but these components are not shown in the drawings and will not be described herein.

The CPU 11 of the MFP 1 serves to control the various functions of the MFP 1 based on fixed values and programs stored in the ROM 12 and RAM 13. The ROM 12 is a non-rewritable memory storing control program 12a and the like executed oil the MFP 1 and a screen management table 12b.

The RAM 14 is a memory for temporarily storing various data. The EEPROM 15 is a nonvolatile rewritable memory for storing various data indicating setting contents for each setting items and fixed values. The telephone/facsimile unit is connected to external devices via a network 30 such as telephone lines, internet service, and the like.

The operating keys 26 allow the user to input commands and data for controlling the MFP 1, such as switching the function of the MFP 1 and display images displayed on the LCD 27. The LCD 27 includes a LCD panel (not shown). The MFP 1 displays prepared images on the LCD panel. The images displayed on the LCD panel will be described later. A touch panel (not shown) is an input device superposed over the surface of the LCD 27. The user touches the touch panel to select images and the like displayed on the LCD 27.

The MFP 1 is configured to switch one of a printing mode, a facsimile mode, and a setting mode based on operations of the operating keys 26. In the printing mode, the MFP 1 can perform a printing operation. In the facsimile mode, the MFP 1 can perform a transmitting to/receiving for facsimiles. In the setting mode, the MFP 1 can change the setting contents for each setting items.

As shown in FIG. 2, a screen management table 12b defines the hierarchical level, screen title, and title ID for each of the prepared screens that can be displayed in an LCD panel of the LCD 27.

The hierarchical level is a value indicating the hierarchical position to which the screen belongs. In the example shown in FIG. 2, each of the screens belongs to one of first through fifth levels. The screen title is configured of a descriptive character string by which the content of the screen can be discerned. One screen title is uniquely assigned to each of the plurality of screens. As will be described later with reference to FIG. 3, this screen title is displayed in the LCD panel together with the corresponding screen. The title ID is a resource ID in the form of a character string. One unique title ID is assigned to each screen title and is used to create the breadcrumbs, as will be described later.

Of the various screens that have been prepared for displaying in the LCD panel of the LCD 27, the description in the first embodiment will particularly focus on screens displayed when a setup mode has been selected. In addition, the hierarchical level, screen title, and title ID for each screen are prestored in the screen management table 12b during the manufacturing stage of the MFP 1.

As shown in FIG. 2, the menu screen having the screen title "Menu" is defined in the screen management table 12b as a first level screen belonging to the first level (hierarchical level 1). Second level screens belonging to the second level (hierarchical level 2) positioned directly below the first level in the hierarchical order are a general setup screen having the screen title "General Setup" and a network setup screen having the screen title "Network." Similarly, the screen management table 12b defines third level screens belonging to the third level (hierarchical level 3) positioned directly below the second level, fourth level screens belonging to the fourth level (hierarchical level 4) positioned directly below the third level, and fifth level screens belonging the fifth level (hierarchical level 5) positioned directly below the fourth level.

Figure 4A:
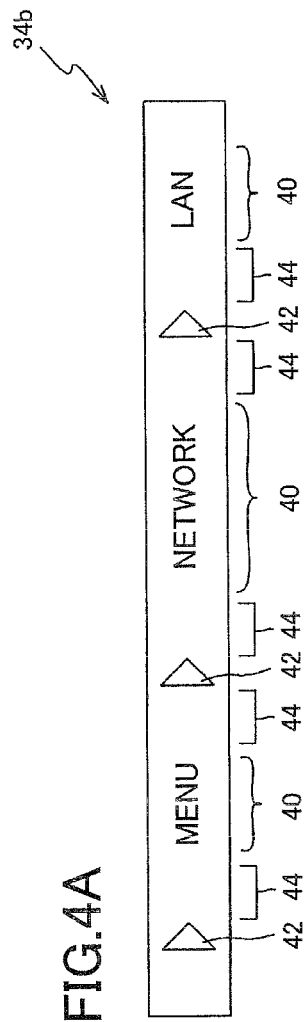
FIG. 4A is an explanatory diagram showing a navigation string that is displayed on the display unit when a concatenated string is small enough to be displayed on the display unit.
Figure 4B:
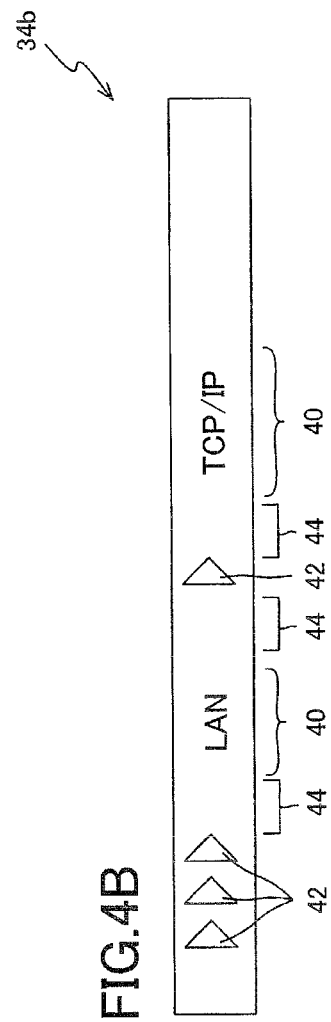
FIG. 4B is an explanatory diagram showing a navigation string that is displayed on the display unit when a concatenated string is too larger to be displayed on the display unit.

The CPU 11 is configured to display one of a plurality of screen images on a title display area 34a of the LCD 27 described later (FIGS. 4A and 4B). The CPU 11 changes a screen image from one to another of the plurality of screen images along a screen navigation path starting from the top hierarchical level to each lower level in sequence. For example, in order to display a TCP/IP screen belonging to the fourth level, the MFP 1 first displays the menu screen of the first level, then displays the network setup screen of the second level, then displays the LAN setup screen (having the screen title "LAN") of the third level, and finally displays the TCP/IP screen of the fourth level.

In this way, the screen management table 12b defines a unique screen navigation path from the menu screen to each screen in the lower hierarchical levels. Hence, the MFP 1 has a plurality of prepared screen navigation paths branching from the menu screen and changes the screen displayed in the LCD panel based on the screen navigation paths.

Figure 3A:
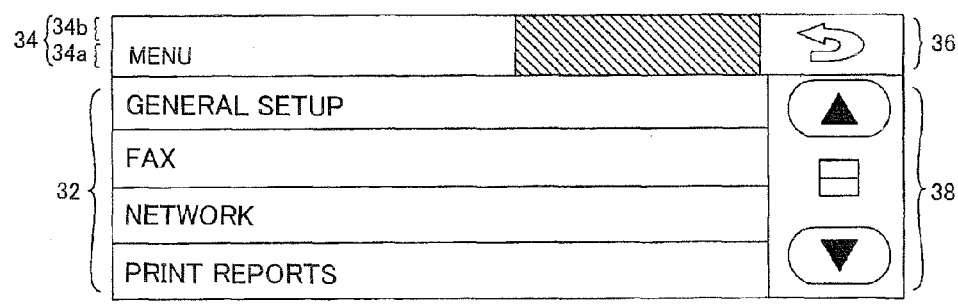
FIG. 3A is an explanatory diagram showing a display unit provided on the display device when a menu screen is displayed on the display unit.

Here, the screens displayed on the LCD 27 will be described with reference to FIGS. 3A-3C. FIG. 3A is an image showing the menu screen displayed in the LCD panel of the LCD 27. The display area of the LCD panel is configured of a selection display area 32, a screen description area 34, a return button area 36, and a sidebar area 38.

Upon entering the setup mode, the MFP 1 displays the menu screen in the selection display area 32 as the initial screen (base screen image). As shown in FIG. 3A, the menu screen includes a list of all possible succeeding screens belonging to the next lower level (hierarchical level 2) located immediately below the menu screen (hierarchical level 1) as choices.

The MFP 1 displays this menu screen when the user performs a prescribed operation on the operating keys 26 for entering the setup mode. Next, the user performs another operation to select one of the choices displayed in the menu screen.

The screen description area 34 includes a title display area 34a, and a breadcrumbs display area 34b. The title display area 34a occupying the lower half of the screen description area 34 is provided for displaying the screen title of the screen currently displayed in the selection display area 32. The breadcrumbs display area 34b occupying the upper half of the screen description area 34 serves to display the breadcrumbs. Since the menu screen shown in FIG. 3A belongs to the top level in the screen management table 12b, there are no breadcrumbs to be displayed at this stage. Hence, only the screen title of the menu screen is displayed in FIG. 3A. The breadcrumbs will be described later with reference to FIGS. 3B and 3C.

The return button area 36 serves as a button that shifts the display in the selection display area 32 back to the screen belonging to the next higher level (preceding level). The return button area 36 is grayed out when displaying the screen belonging to the topmost level in the screen management table 12b.

The sidebar area 38 serves to display an image functioning as buttons or a scrollbar for scrolling the screen displayed in the selection display area 32. Hence, if there are too many choices to fit in the selection display area 32, the user can operate the buttons or scrollbar design displayed in the sidebar area 38 to scroll the screen displayed in the selection display area 32 in order to browse through all possible choices.

Figure 3B:
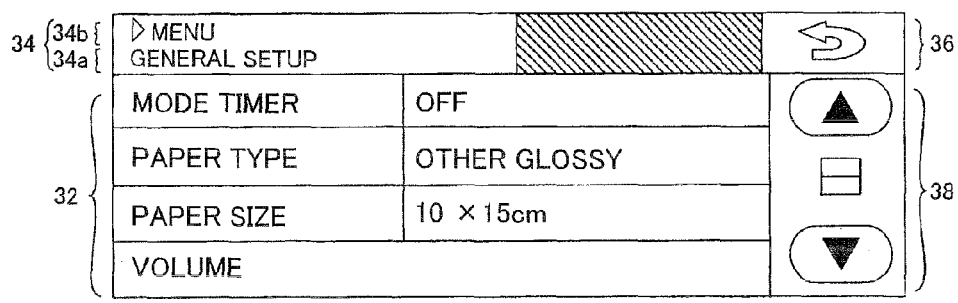
FIG. 3B is an explanatory diagram showing a display unit provided on the display device when a general setup screen is displayed on the display unit.

FIG. 3B is an image showing the general setup screen displayed in the LCD panel. If the user selects the choice "General setup" in the menu screen described with reference to FIG. 3A, the MFP 1 changes the screen displayed in the selection display area 32 to the general setup screen.

The general setup screen displayed in the selection display area 32 is configured of a list of setting items. As shown in FIG. 3B, the general setup screen may also include the current value assigned to each setting item. By checking the current value for each setting, the user can perform an operation to select a setting item that needs to be modified, instructing the MFP 1 to change the display in the LCD panel to a modification screen for the selected setting item.

In addition, the screen title "General Setup" for the general setup screen displayed in the selection display area 32 is displayed in the title display area 34a of the screen description area 34, and the screen title "Menu" for the menu screen that was displayed prior to arriving at the currently displayed general setup screen is displayed in the breadcrumbs display area 34b as the breadcrumbs ">Menu". Hence, breadcrumbs are a character string indicating the path of screens through which the user navigated to arrive at the current screen. The ">" symbol included in the breadcrumbs is a separating character and is disposed at the head of the screen title. By viewing these breadcrumbs, the user can view the path of screens navigated through to arrive at the currently displayed screen. Note that the separating character is displayed in FIGS. 3A-3C as a triangle.

Figure 3C:
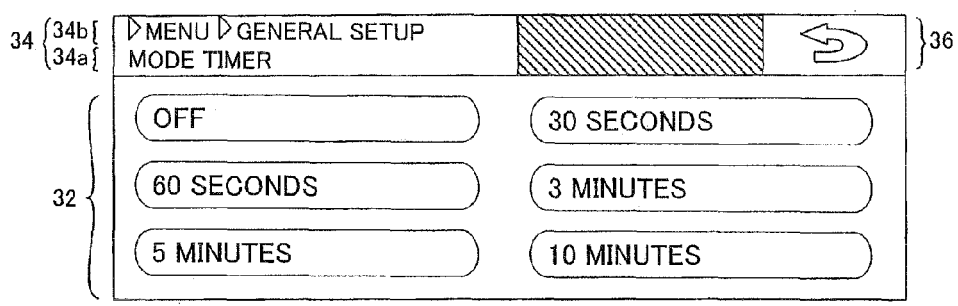
FIG. 3C is an explanatory diagram showing a display unit provided on the display device when a modification screen is displayed on the display unit.

FIG. 3C is an image of a modification screen displayed in the LCD panel. When the user performs an operation in the general setup screen shown in FIG. 3B to select the setting item "Mode Timer," the MFP 1 changes the screen displayed on the selection display area 32 to the modification screen for this selected setting item.

The modification screen displayed in the selection display area 32 has a list of possible values for the setting item. If the user chooses the selection "30 seconds" in the example modification screen shown in FIG. 3C, the MFP 1 stores the setting value "30 seconds." corresponding to this selection in the EEPROM 1.5 as the value for the setting item "Mode Timer." Subsequent processes are executed based on the values stored in the EEPROM 15.

In the example shown in FIG. 3C, the screen title "Mode Timer" is displayed in the title display area 34a of the screen description area 34, while the breadcrumbs ">Menu>General Setup" are displayed in the breadcrumbs display area 34b.

If the user selects the return button area 36 while the modification screen shown in FIG. 3C is displayed in the LCD panel, the MFP 1 changes the display on the selection display area 32 to the screen belonging to one level above the level including the modification screen. That is, the MFP 1 changes the display on the selection display area 32 to the screen associated with the screen title displayed at the end (rightmost side) of the breadcrumbs. Hence, the user can determine which screen will be displayed when the return button area 36 is selected based on the screen title positioned at the end of the breadcrumbs.

Although only one screen navigation path is described with reference to FIGS. 3A-3C, the MFP 1 can change screens displayed in the selection display area 32 of the LCD panel based on any one of a plurality of predetermined screen navigation paths branching from the menu screen (shown in FIG. 3A) according to a process similar to that described above with reference to FIGS. 3A-3C.

Next, the breadcrumbs will be described in greater detail with reference to FIGS. 4A and 4B. FIGS. 4A and 4B are enlarged views of the breadcrumbs display area 34b. FIG. 4A shows the breadcrumbs display area 34b when the TCP/IP setup screen having the screen title "TCP/IP" is displayed in the LCD panel. At this time, the screens positioned along the screen navigation path from the menu screen to the TCP/IP setup screen include the menu screen network setup screen and LAN setup screen.

As shown in FIG. 4A, the breadcrumbs include screen titles 40, separating characters 42 disposed at the head of each screen title 40, and spaces 44 disposed between each adjacent screen title 40 and separating character 42.

The screen titles 40 are arranged in order from left to right, beginning from the screen title 40 for the screen nearest the menu screen along the screen navigation path. That is, the MFP 1 configures the breadcrumbs of screen titles 40 arranged in order beginning from the screens belonging to the highest level (the level with the lowest hierarchical number). In the example of the breadcrumbs shown in FIG. 4A, the screen titles 40 are arranged in the order "Menu," "Network," and "LAN" beginning from the head of the breadcrumbs. Therefore, by reading the breadcrumbs from the head (left end), the user can determine the screen navigation path. In this example, the user can see that the network setup screen is displayed as the succeeding screen to the menu screen, the LAN setup screen is displayed as the succeeding screen to the network setup screen, and the TCP/IP setup screen is displayed as the succeeding screen to the LAN setup screen.

In the example shown in FIG. 4A, the breadcrumbs created by concatenating screen titles for these three screens is shorter than the width (longitudinal dimension) of the breadcrumbs display area 34b. Thus, the entire breadcrumbs from beginning to end can be displayed in the breadcrumbs display area 34b.

As described above, since the breadcrumbs are created by concatenating screen titles for all screens up to, but not including, the currently displayed screen, if the user navigates from the TCP/IP setup screen to an IP address setup screen, the screen title "TCP/IP" for the TCP/IP setup screen (i.e., the originating point of the transition) is appended to the end of the breadcrumbs. However, since the size of the breadcrumbs display area 34b is fixed, the new character string constituting the breadcrumbs after adding the new screen title is now too long to fit inside the breadcrumbs display area 34b.

When the character string formed by concatenating screen titles for each screen in the screen navigation path (hereinafter referred to as a "concatenated string") does not fit in the breadcrumbs display area 34b, the MFP 1 displays the breadcrumbs in the breadcrumbs display area 34b after collapsing one or more screen titles occupying the head of the breadcrumbs, as illustrated in FIG. 4B. More specifically, the MFP 1 generates a concatenated string by deleting screen titles for screens positioned on the menu screen side of the screen navigation path from the concatenated string formed with separating characters 42 inserted between adjacent screen titles, and displays this new concatenated string in the breadcrumbs display area 34b as the breadcrumbs. Hence, screen titles for more recently displayed screens are given priority in the breadcrumbs that are displayed, while screen titles for screens positioned on the menu screen side are omitted from the breadcrumbs (excluded from the display).

Since the screen titles 40 for screens nearest the currently displayed screen along the screen navigation path are included in the displayed breadcrumbs in this way, the user can easily determine where the currently displayed screen is positioned in the screen navigation path, even when the space allocated for the breadcrumbs display area 34b is not sufficient to display the entire path.

In the example shown in FIG. 4B, only screen titles 40 are removed from the breadcrumbs, while the separating character 42 provided at the head of each screen title 40 remains in the display. Therefore, separating characters 42 of a number corresponding to the number of screens for which screen titles 40 were omitted are arranged consecutively at the beginning of the breadcrumbs. Hence, as the number of screen titles 40 removed from the breadcrumbs grows larger, the number of consecutively displayed separating characters 42 grows. Therefore, the consecutive separating characters 42 function as symbols indicating screen titles 40 that have been omitted from the breadcrumbs.

Based on the number of separating characters 42 arranged consecutively at the beginning of the breadcrumbs, the user can intuitively understand the number of screen titles that have been omitted (the number of levels that have been collapsed) and can intuitively understand the hierarchical depth of the level in which the currently displayed screen belongs.

Figure 6:
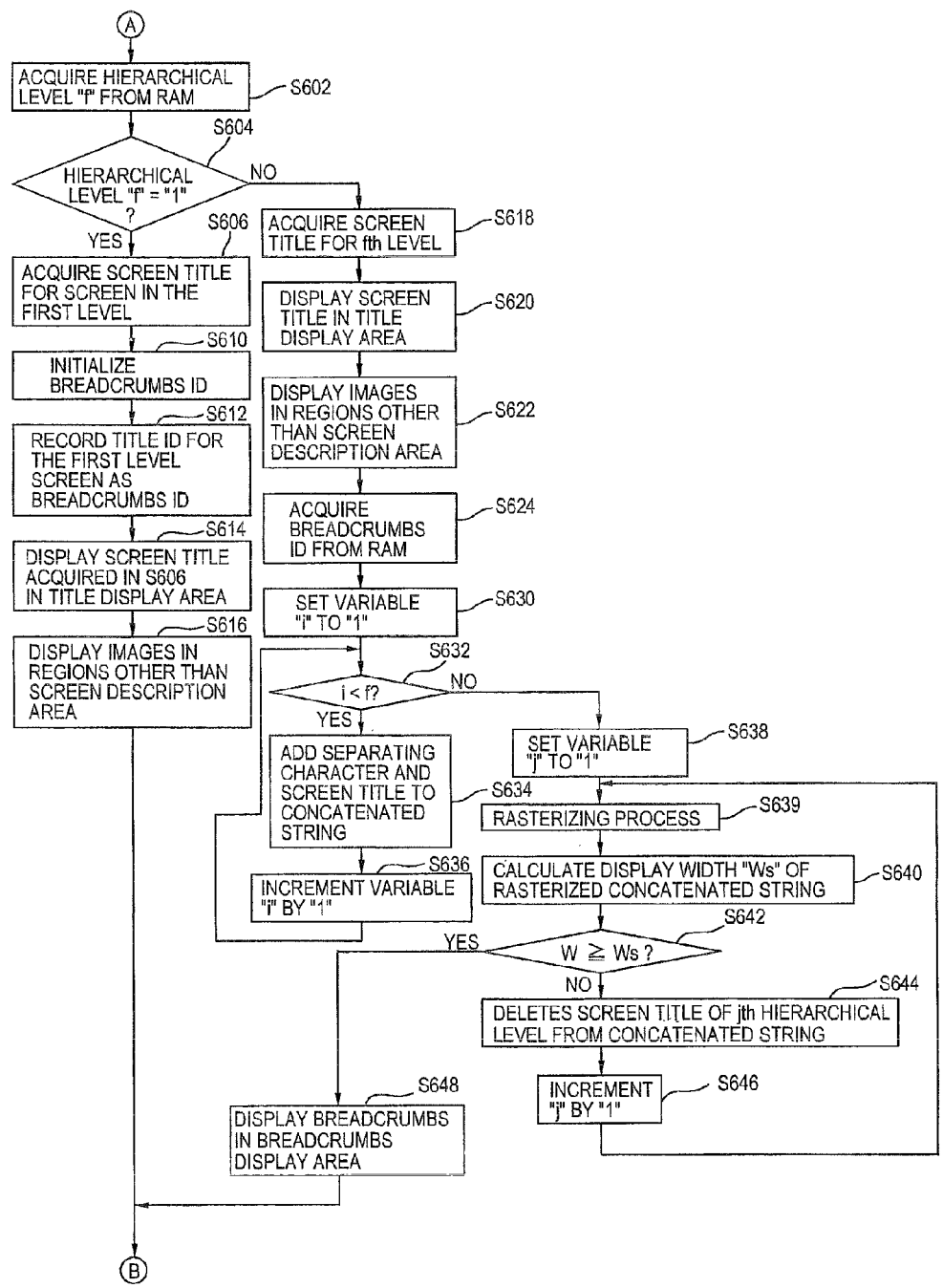

FIGS. 5 and 6 are flowcharts illustrating steps in a setup screen display process. The MFP 1 periodically executes the setup screen display process when in the setup mode. In S502 at the beginning of the setup screen display process, the CPU 11 attempts to acquire or checks for a screen navigation event. In S504 the CPU 11 determines whether there was a screen navigation event to acquire. If the CPU 11 determines that there was no screen navigation event (S504: NO), the CPU 11 repeats the process in S502.

However, if the CPU 11 determines in S504 that a screen navigation event was acquired (S504: YES), in S506 the CPU 11 acquires the hierarchical level f for the current screen. In S508 the CPU 11 determines whether the screen navigation event acquired in S502 indicates a transition to the menu screen. For example, if the user performs a prescribed operation on the operating keys 26 to return to the menu screen (see FIG. 3A; S508: YES), in S510 the CPU 11 sets the hierarchical level f to "1" and advances to S602 of FIG. 6.

However, if the CPU 11 determines that the screen navigation event does not correspond to a transition to the menu screen (S508: NO), in S512 the CPU 11 determines whether or not the screen navigation event indicates a transition to a lower level screen. In other words, the CPU 11 determines whether or not the screen is changed along the navigation path in a direction away from the menu screen. For example, if the user chooses a selection displayed in the selection display area 32 (S512: YES), in S514 the CPU 11 increments the hierarchical level f by "1", in S516 adds the hierarchical level f and the title ID for the destination screen to the end of a breadcrumbs ID, and subsequently advances to S602 of FIG. 6.

Here, the breadcrumbs ID will be described. The breadcrumbs ID is configured of hierarchical levels and title IDs and indicates the screen navigation path leading to the currently displayed screen. This breadcrumbs ID is stored in the RAM 14 and is updated each time the screen changes. For example, if the current screen is the TCP/IP setup screen positioned in the fourth level in the screen management table 12b, the screen navigation path from the menu screen to the current screen is indicated in the breadcrumbs as ">Menu>Network>LAN." In this case, the following data is saved as the breadcrumbs ID: [1]ID00[2]ID90[3]ID91[4]ID93, where the number in the "[ ]" corresponds to the hierarchical level, and each character string starting with "ID" is a title ID.

For example, if the acquired event indicates a transition to a lower level screen (S512: YES), the screen will be changed to a screen located in the next lower hierarchical level. Accordingly, the hierarchical level and the title ID of the destination screen are added to the end of the breadcrumbs ID. As a result, the following data is saved as the breadcrumbs ID, for example: [1]ID00[2]ID90[3]ID91[4]ID93[5]ID94.

However, if the event is not a transition to a lower level screen (S512: NO), in S518 the CPU 11 determines whether the screen navigation event indicates a transition to a higher level screen. In other words, the CPU 11 determines whether or not the screen is changed along the navigation path in a direction toward the menu screen. For example, when the user operates the return button area 36 (S518: YES), in S520 the CPU 11 deletes the hierarchical level f and the title ID of the current screen (i.e., the originating point of the transition) from the end of the breadcrumbs ID, in S522 decrements the hierarchical level f by "1", and subsequently advances to S602 of FIG. 6.

However, if the event does not indicate a transition to an upper level screen (S518: NO), in S524 the CPU 11 determines whether the screen navigation event indicates an instruction to end the setup screen display process. For example, when the user inputs an instruction to switch from the setup mode to another mode (S524: YES), the CPU 11 ends the setup screen display process. However, the CPU 11 determines that the screen navigation event does not indicate an instruction to end the setup screen display process (S524: NO), the CPU 11 returns to the process in S502.

The continuation of the setup screen display process will be described with reference to FIG. 6. In S602 the CPU 11 acquires the hierarchical level f from the RAM 14. In S604 the CPU 11 determines if the hierarchical level f is "1".

If the hierarchical level f is equal to 1 (S604: YES), in S606 the CPU 11 acquires the screen title for the screen in the first level (i.e., the menu screen) from the screen management table 12b.

In S610 the CPU 11 initializes the breadcrumbs ID. In S612 the CPU 11 records the title ID for the first level screen as the breadcrumbs ID. In S614 the CPU 11 displays the screen title acquired in S606 in the title display area 34a. In S616 the CPU 11 displays (writes) images in regions other than the screen description area 34. Specifically, the CPU 11 writes images in the selection display area 32, return button area 36, and sidebar area 38. Subsequently, the CPU 11 returns to S502 of FIG. 5.

However, if the CPU 11 determines in S604 that f is not equal to 1 (S604: NO), in S618 the CPU 11 acquires the screen title for the $f^{th}$ level, i.e., the screen title of the destination screen from the screen management table 12b. In S620 the CPU 11 displays the acquired screen title in the title display area 34a. In S622 the CPU 11 displays (writes) images in regions other than the screen description area 34. In other words, when the user operation indicates a transition to an upper level screen, the CPU 11 navigates to the next screen in the screen navigation path in a direction toward the menu screen (i.e., toward a smaller numbered hierarchical level). On the other hand, when the user operation indicates a transition to a lower level screen, the CPU 11 navigates to the next screen in the screen navigation path in a direction away from the menu screen (i.e., toward a larger numbered hierarchical level).

In S624 the CPU 11 acquires the breadcrumbs ID from the RAM 14 and thereafter creates a string of screen titles concatenated in order of increasing hierarchical level based on the breadcrumbs ID. Specifically, in S630 the CPU 11 sets a variable i to "1" and in S632 determines whether the variable i is smaller than the hierarchical level f. If i is smaller than f (S632: YES), in S634 the CPU 11 adds the separating character and screen title to the concatenated string. More specifically, the CPU 11 reads the title ID for the $i^{th}$ level stored in the breadcrumbs ID, acquires the screen title corresponding to the title ID from the screen management table 12b, and adds this screen title with the separating character positioned at the head thereof to the end of the concatenated string.

In S636 the CPU 11 increments the variable i by "1" and subsequently returns to S632 to repeat the process described above. By repeatedly performing the process in S634, the CPU 11 can create a concatenated string that includes the screen title of all screens positioned in a part of the screen navigation path from the menu screen to the currently displayed screen that is displayed on the selection display area 32 currently, with a separating character inserted between each pair of adjacent screen titles.

When the CPU 11 determines in S632 that i is greater than or equal to f (S632: NO), in S638 the CPU 11 sets a variable j to "1", in S639 rasterizes the concatenated string created above, and in S640 calculates a display width Ws corresponding to the length of the rasterized concatenated string in the longitudinal direction.

Figure 7:
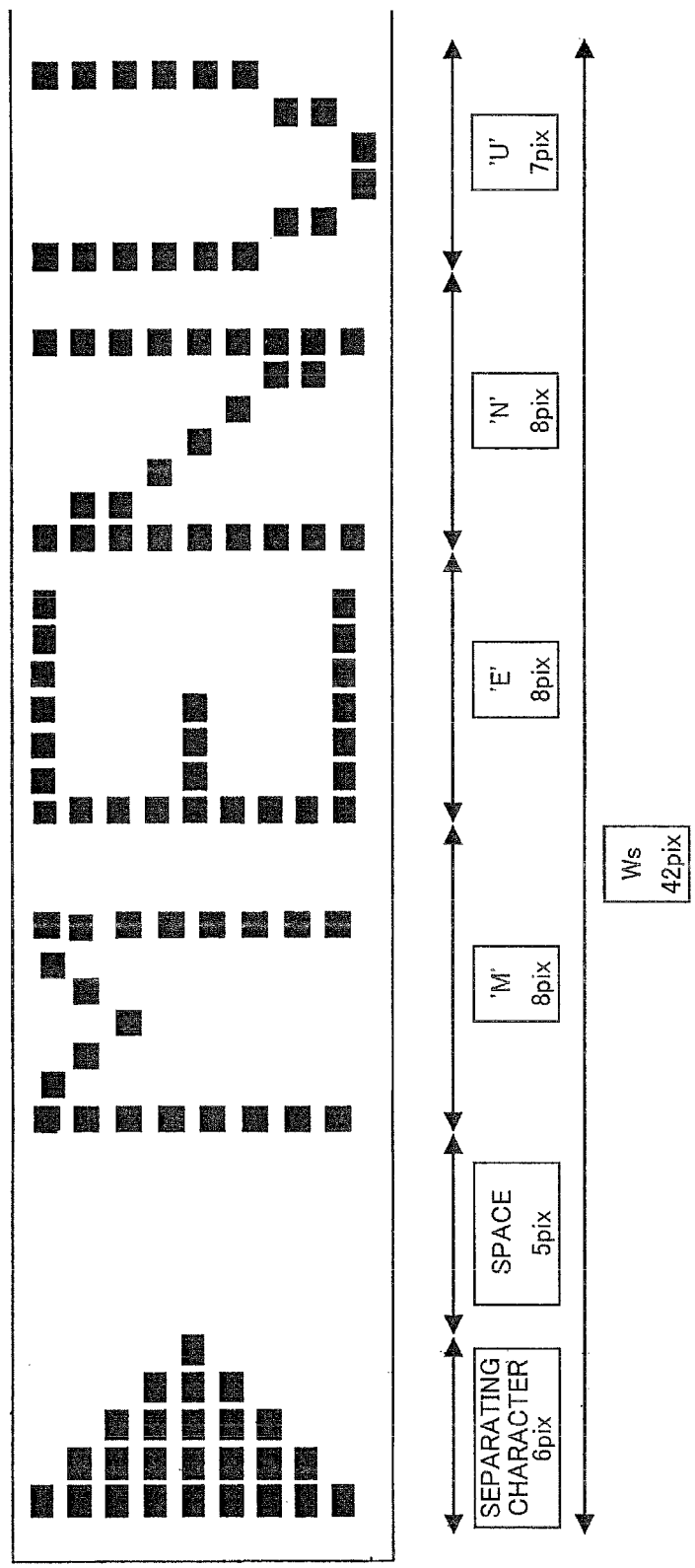
FIG. 7 is an enlarged view of a rasterized concatenated string.

Through the rasterization process, the CPU 11 develops the concatenated string represented by character codes into a bitmap image represented by an array of points (pixels) as shown in FIG. 7. In the first embodiment, the CPU 11 totals the number of pixels in the width direction required to display each character and space in order to calculate the display width Ws corresponding to the longitudinal length of the concatenated string.

Further, during rasterization the CPU 11 reads settings from the EEPROM 15 for the size and font of the text to be displayed in the breadcrumbs display area 34b and develops a bitmap image corresponding to this text size and font. For example, the user may be allowed to select from among large, medium, and small text sizes for the text to be displayed in the LCD panel.

The MFP 1 may also allow the user to select a desired font for the text to be displayed in the LCD panel. For some fonts, the width of each character may differ. With a proportional font, for example, the letter "U" shown in FIG. 7 has a width of seven pixels, while the letters "M", "E", and "N" have respective widths of eight pixels. Further, in many cases the width of roman characters differs from the width of Chinese characters (kanji). Hence, the CPU 11 can acquire a more accurate display width Ws through a calculation based on the rasterized bitmap image than through a calculation simply based on the number of characters.

Returning to FIG. 6, in S642 the CPU 11 determines whether or not the entire concatenated string can be displayed inside the breadcrumbs display area 34b. In other words, the CPU 11 determines whether or not the concatenated string is small enough to be displayed entirely on the breadcrumbs display area 34b (whether or not the concatenated string is too large to be displayed entirely on the breadcrumbs display area 34b). That is, the CPU 11 determines whether or not the display width Ws is less than or equal to a predetermined width W, where the predetermined width W is a value equivalent to the number of pixels in the breadcrumbs display area 34b along the horizontal direction (longitudinal direction) thereof that can be used for displaying text.

If the CPU 11 determines that the display width Ws is greater than the predetermined width W, i.e., that the entire concatenated string cannot fit inside the breadcrumbs display area 34b (S642: NO), in S644 the CPU 11 omits (deletes) the screen title of the $j^{th}$ level (hierarchical level f=j) from the concatenated string, in S646 increments j by "1", and returns to S639. In other words, the CPU 11 removes the screen title for the screen positioned closest to the menu screen side with respect to the screen navigation path from the screen titles constituting the concatenated string.

The CPU 11 repeatedly removes screen titles in S644 until determining in S642 that the entire length of the concatenated string can fit inside the breadcrumbs display area 34b. In other words, the CPU 11 sequentially removes the leading (leftmost) screen title from the concatenated string to be displayed in the breadcrumbs display area 34b until the concatenated string no longer extends beyond the breadcrumbs display area 34b. Therefore, the CPU 11 creates a navigation string by deleting, from the concatenated string, an at least one of the screen title (title strings) 40 corresponding to at least one of the all screens nearest the menu screen side of the navigation path when the CPU 11 determines that the concatenated string is too large to be displayed entirely on the breadcrumbs display area 34b.

As described above, the display width Ws is calculated based on the rasterized concatenated string and, therefore, accurately reflects the actual length of the breadcrumbs that will be displayed in the breadcrumbs display area 34b. Accordingly, since the CPU 11 determines whether the entire concatenated string will fit inside the breadcrumbs display area 34b based on this display width Ws, the CPU 11 can display the maximum number of screen titles in the breadcrumbs display area 34b.

When the CPU 11 determines that the display width Ws is less than or equal to the predetermined width W after repeating the above process, indicating that the entire concatenated string can fit inside the breadcrumbs display area 34b (S642: YES), in S648 the CPU 11 sets this concatenated string as the breadcrumbs and displays the breadcrumbs in the breadcrumbs display area 34b. Accordingly, the CPU 11 can minimize the number of screen titles that are removed so that the maximum number of screen titles can be displayed in the breadcrumbs display area 34b. Further, the CPU 11 displays, in the breadcrumbs display area 34b, the navigation string created through S639-646 and the separating character 42 as a symbol indicating that the at least one of the screen title 40 has been deleted from the concatenated string. More specifically, the symbol consists of a number of separating characters 42 corresponding to a number of the deleted screen titles 40. Further, when the concatenated strings created in S634 and S639 first time is small enough to be displayed entirely on the breadcrumbs display area 34b, the CPU 11 displays the concatenated strings without deleting the screen title in S648.

Through the setup screen display process described in FIGS. 5 and 6, the MFP 1 creates a concatenated string formed by concatenating the screen titles for all screens positioned along the screen navigation path from the menu screen to the destination screen, each time the displayed screen is being changed, and creates breadcrumbs based on this concatenated string. For example, if the user navigates to a screen positioned in a direction toward the menu screen along the screen navigation path, allowing for a screen title that was previously collapsed (deleted) to be displayed again, the MFP 1 includes this screen title in the display. Therefore, the MFP 1 can always display the maximum number of screen titles in the breadcrumbs display area 34b.

Next, a second embodiment will be described with reference to FIGS. 8 and 9. In the second embodiment, when the user inputs an instruction to enter the setup mode through a prescribed operation on the EEPROM 15, the MFP 1 displays a screen title indicating the menu screen in the title display area 34a of the LCD panel and displays selectable succeeding screens in the selection display area 32. At this time, the user can perform an operation to select one of the choices displayed in the selection display area 32. For example, if the user wishes to modify a setting item related to the network function, the user performs an operation to select the choice "Network" from among the possible choices "General Setup" and "Network" displayed in the selection display area 32. In response, the MFP 1 changes the display on the LCD 27 to the screen corresponding to the user's selection.

Figure 8:
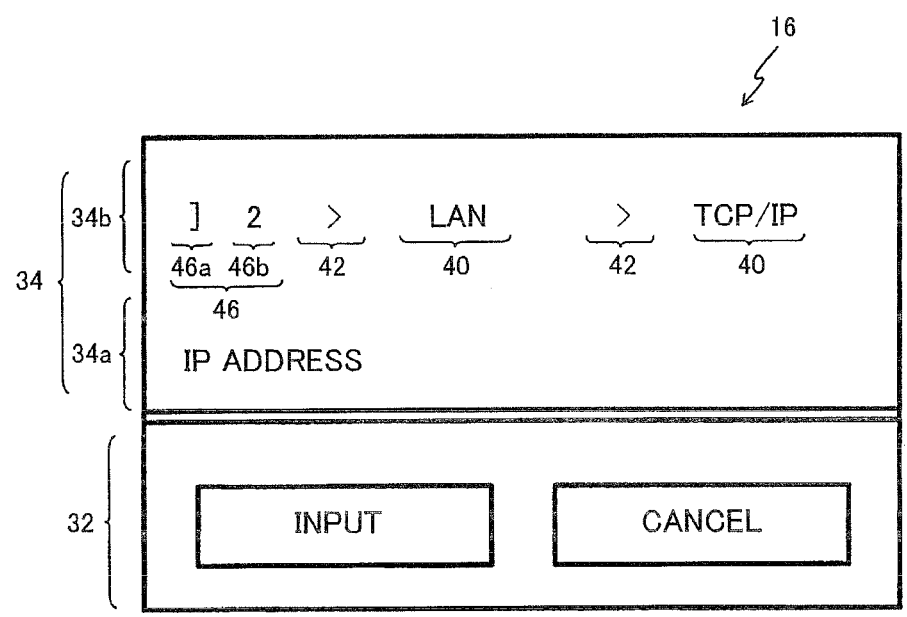
FIG. 8 is an explanatory diagram showing a navigation string that is displayed on a display unit provided on a display device according to a second embodiment when a concatenated string is too larger to be displayed on the display unit.

FIG. 8 shows an example in which the above procedure has been performed to select the IP address setup screen belonging to the fifth level. In this case, the screen title "IP address" for the currently displayed screen is displayed in the title display area 34a, and the selectable succeeding screens "Input" and "Cancel" to the IP address setup screen are displayed in the selection display area 32. In addition, the breadcrumbs "] 2>LAN>TCP/IP" are displayed in the breadcrumbs display area 34b.

When the breadcrumbs indicating the user's navigation to the IP address setup screen belonging in the fifth level are shorter than the horizontal width (longitudinal dimension) of the breadcrumbs display area 34b, the breadcrumbs ">Menu>Network>LAN>TCP/IP" are displayed in the breadcrumbs display area 34b instead of the breadcrumbs "] 2>LAN>TCP/IP" shown in FIG. 8. In the second embodiment, the MFP 1 adds an omission symbol 46 to the head of this concatenated string, and subsequently displays the concatenated string as the breadcrumbs.

In this way, the MFP 1 omits the "Menu" and "Network" screen titles from the breadcrumbs displayed in the breadcrumbs display area 34b and adds the omission symbol 46 to the front of the separating character 42 disposed in front of the screen title "LAN," as shown in FIG. 8. The omission symbol 46 is configured of an omission separating character 46a having a format different from the separating character 42, and an omission number 46b indicating the number of screen titles that have been omitted.

Hence, when the breadcrumbs display area 34b is not wide enough to hold the entire breadcrumbs, the user can recognize that screen titles have been omitted by the presence of the omission separating character 46a. The user can also determine from the omission number 46b that two screen titles ("Menu" and "Network" in this case) have been omitted. As a result, the user can determine that the screen title "LAN" is positioned in the third level along the screen navigation path, even though the "Menu" and "Network" screen titles have been omitted.

Next, the setup screen display process executed in the second embodiment will be described to FIG. 9. The setup screen display process of FIG. 9 is identical to the process of FIGS. 5 and 6 according to the first embodiment except that the process of S644 is replaced with processes of S1644-1652.

When the display width Ws is greater than the predetermined width W, indicating that the entire concatenated string will not fit inside the breadcrumbs display area 34b (S642: NO), in S1644 the CPU 11 deletes (omits) the screen title 40 in the $j^{th}$ level (hierarchical level f=j) from the concatenated string and changes the separating character 42 added in front of the deleted screen title to the omission separating character 46a.

In S1646 the CPU 11 determines whether there are two consecutive omission separating characters 46a present in the concatenated string. If there are not two consecutive omission separating characters 46a (S1646: NO), then one of two cases is possible: there exists only a single omission separating character 46a in the concatenated string (i.e., ")> . . .") or the omission separating character 46a inserted in place of the separating character 42 in S1644 is positioned on the right side of the omission number 46b in the concatenated string (i.e., ") n)> . . . ," where n is an integer of 2 or greater). Thus, in S1650 the CPU 11 determines whether an omission separating character 46a is present on the right side of the omission number 46b.

If the CPU 11 determines that a omission separating character 46a is not present on the right of the omission number 46b (S1650: NO), indicating that only a single omission separating character 46a is present (i.e., ")> . . ."), in S646 the CPU 11 increments j by "1" and returns to S640. Thus, through the above process (S1644, S1646: NO, S1650: NO), the CPU 11 removes the screen title 40 for the screen positioned in the first level within the screen navigation path from the screen titles constituting the concatenated string, and converts the separating character 42 included in front of the screen title 40 that was removed to a omission separating character 46a. Hence, the CPU 11 can convert the concatenated string to the format "]> . . .".

However, if the CPU 11 determines in S1650 that the omission separating character 46a inserted in place of the separating character 42 in S1644 is positioned to the right of the omission number 46b in the concatenated string (i.e., ") n)> . . ."; S1650: YES), then in S1652 the CPU 11 increments the omission number 46b by "1" and deletes the omission separating character 46a positioned on the right of the omission number 46b. Subsequently, the CPU 11 advances to S1646. Hence, through the above process (S1644, S1646: N0, S1650: YES, and S1652), the CPU 11 can remove the screen title 40 of the screen positioned in (n+1)$^{th}$ level of the screen navigation path from the concatenated string and can add the omission symbol 46 configured of "] n+1" to the concatenated string. In other words, the CPU 11 can change the concatenated string to the format "] n+1> . . . ".

Further, if the CPU 11 determines that there are two consecutive omission separating characters 46a (i.e., "))> . . ."; S1646: YES), in S1648 the CPU 11 deletes the omission separating character 46a on the right and inserts a "2" in its place in the concatenated string as the omission number 46b. Subsequently, the CPU 11 advances to S646. Through the above process (S1644, S1646: YES, and S1648), the CPU 11 can remove the screen title 40 for the screen positioned in the second level of the screen navigation path from the concatenated string and can add the omission symbol 46 comprising "] 2" to the concatenated string. The omission symbol 46 indicates the number of deleted screen title 40. In other words, the CPU 11 can change the concatenated string to the format "] 2> . . .".

As described above, the MFP 1 omits one or more of the screen titles 40 constituting the head of the breadcrumbs when displaying the breadcrumbs if the concatenated string formed by concatenating the screen titles 40 for all screens along the screen navigation path up to, but not including the currently displayed screen, with a separating character 42 inserted between each pair of adjacent screen titles 40, does not fit in the breadcrumbs display area 34b. Since this process allows the MFP 1 to display screen titles 40 for screens nearest the currently displayed screen with respect to the screen navigation path, the user can easily understand where the currently displayed screen is positioned along the screen navigation path, even when the breadcrumbs display area 34b is too narrow to display the entire path.

Further, when deleting (omitting) screen titles because the width of the breadcrumbs display area 34b is insufficient to display the entire breadcrumbs, the MFP 1 displays the omission symbol 46, and specifically the omission separating character 46a of a format different from the separating character 42 and the omission number 46b indicating the number of screen titles that have been omitted, in the breadcrumbs display area 34b together with the screen titles 40. The user can quickly determine that screen titles have been excluding by the inclusion of the omission separating character 46a and can determine the number of omitted screen titles based on the omission number 46b. Therefore, the user can determine at a glance in which level the initial screen title 40 displayed in the breadcrumbs display area 34b is positioned, even though some screen titles have been omitted.

Figure 12:
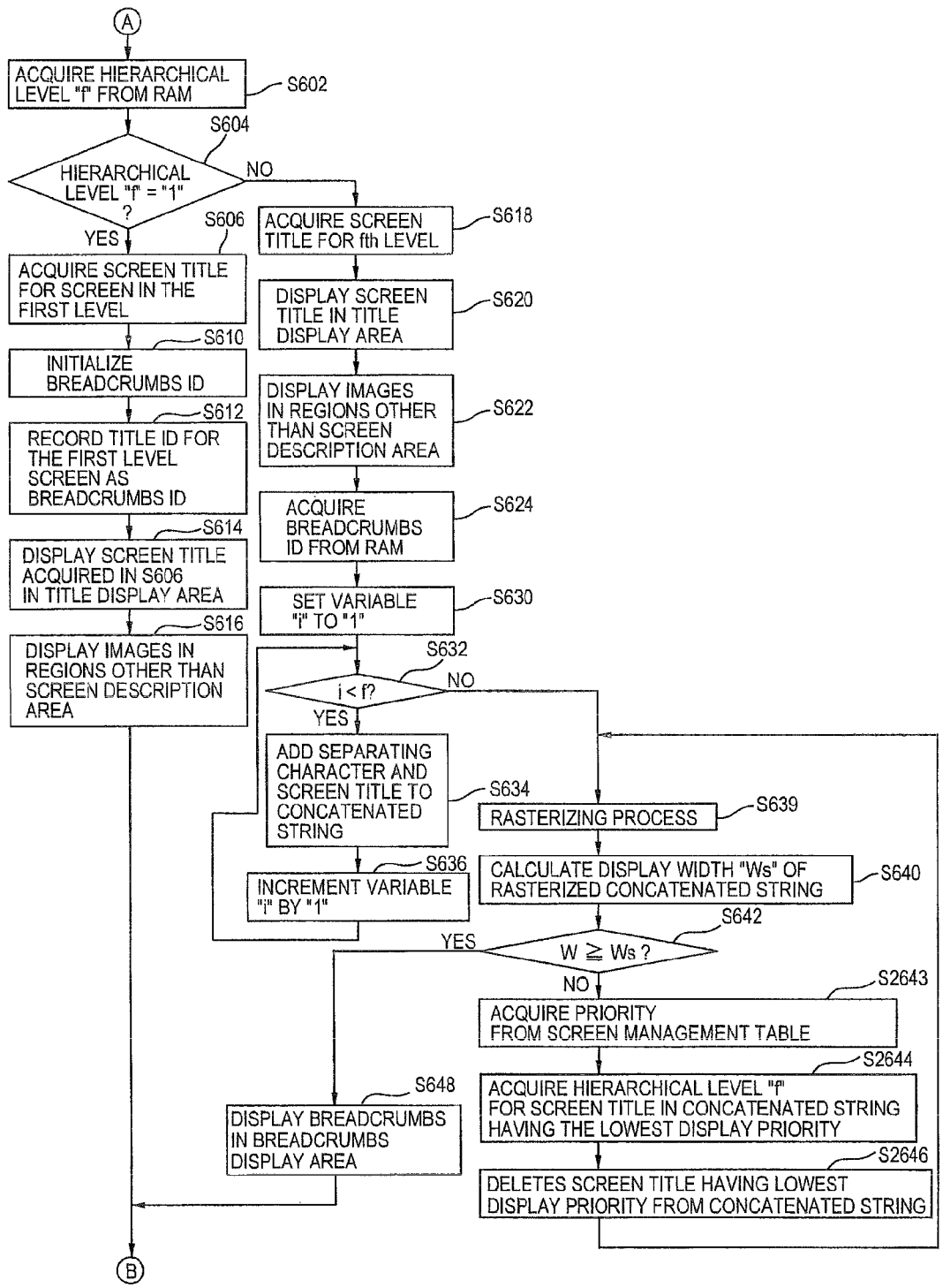
FIG. 12 is a flowchart illustrating steps in a part of a setup screen display process executed by the display device according to the third embodiment.

Next, a third embodiment will be described with reference to FIGS. 10 through 12. In the third embodiment, a screen management table 212b shown in FIG. 10 is stored in the ROM 12 during the manufacturing stage of the MFP 1. The screen management table 212b further defines a display priority for each screen title in addition to the titles and hierarchical IDs.

Here, the "display priority" is a value representing the degree of priority the associated screen title has for being displayed in breadcrumbs. Each screen title is assigned one of a high display priority "2" and a low display priority "1" in the screen management table 212b. The relationship between the priority level and the breadcrumbs will be described later with reference to FIG. 12.

In the third embodiment, when the concatenated string does not fit in the breadcrumbs display area 34b, the MFP 1 displays the breadcrumbs in the breadcrumbs display area 34b after collapsing one or more screen titles occupying the head of the breadcrumbs, as illustrated in FIG. 11B. More specifically, the MFP 1 generates a concatenated string by deleting screen titles assigned the low display priority "1" from the breadcrumbs and displays this new concatenated string in the breadcrumbs display area 34b as the breadcrumbs. Hence, screen titles assigned the low display priority "1" are omitted from the breadcrumbs (excluded from the display).

Since the screen titles 40 assigned the high display priority "2" are included in the displayed breadcrumbs in this way, the user can easily determine where the currently displayed screen is positioned along the screen navigation path, even when the space allocated for the breadcrumbs display area 34b is not sufficient to display the entire path.

Based on the screen management table 212b shown in the example of FIG. 10, the MFP 1 acquires the high display priority "2" for the screen title "Menu" of the menu screen, the screen title "Network" for the screen positioned in the hierarchical level immediately below the menu screen along the screen navigation path, and the screen title "WLAN" for the wireless LAN setup screen, serving as a wizard start screen described later. For example, if a popup screen is temporarily displayed during an interrupt when a facsimile is received, the user can temporarily interrupt the current operation and, upon returning later, recall that the setup mode is still selected based on the screen title for the menu screen displayed at the head of the breadcrumbs.

The user can also recognize the position of the currently displayed screen within the screen navigation path based on the screen title of the screen positioned hierarchically below the menu screen along the screen navigation path. The user can also recognize where the currently displayed screen is positioned within the screen navigation path based on the screen title of the wizard start screen.

Based on the screen management table 212b used in the example of FIG. 10, the MFP 1 acquires the high display priority "2" for the wizard start screen, which is a higher priority than that assigned to subsequent wizard screens linked to the wizard start screen. In the example of FIG. 10, the wireless LAN setup screen having the screen title "WLAN" in the third hierarchical level corresponds to a wizard start screen and has been assigned the high display priority "2". The SSID setup screen in the fourth level and the new SSID setup screen in the fifth level correspond to lower level wizard screens and have been assigned the low display priority "1".

Here, a "wizard" is a function for displaying a plurality of wizard screens in a predetermined order, prompting the user to set values for a plurality of setting items in a predetermined order. In the preferred embodiment, the wizard starts from the wireless LAN setup screen. The wireless LAN setup screen includes a message indicating that the wizard will begin and describing the type of settings that can be performed with this wizard, for example. If the user operates a button in the wireless LAN setup screen for selecting the next screen, the MFP 1 changes the displayed screen to the SSID setup screen, which constitutes the wizard screen positioned one hierarchical level lower than the start screen. A plurality of SSID candidates is displayed in the SSID setup screen. If the user selects "Enter new SSID" in the SSID setup screen and operates a button for navigating to the next screen, the MFP 1 changes the display to the new SSID setup screen, which is a wizard screen positioned one hierarchical level lower than the previous screen.

FIG. 11B shows the breadcrumbs generated when the new SSID setup screen in the fifth hierarchical level is displayed in the selection display area 32. In the third embodiment, if the concatenated string does not fit in the breadcrumbs display area 34b even though all screen titles 40 having the low display priority "1" have been omitted from the concatenated string, the MFP 1 removes the screen title 40 for the screen positioned on the menu screen side of the screen navigation path (i.e., the screen title for the screen in the highest level). In other words, the MFP 1 gives priority to displaying screen titles of screens nearest the currently displayed screen in the breadcrumbs. In this way, the user can recognize that the currently displayed screen is one in a series of wizard screens beginning from the wireless LAN setup screen in a level beneath the network setup screen.

Next, the setup screen display process executed in the third embodiment will be described to FIG. 12. The setup screen display process of FIG. 12 is identical to the process of FIGS. 5 and 6 according to the first embodiment except that the processes of S644 and S646 are replaced with processes of S2643-2646.

When the display width Ws is greater than the predetermined width W (S642: NO), in S2643 the CPU 11 acquires the priorities from the screen management table 212b in order to extract the display priority of the screen title for each screen.

In S2644 the CPU 11 acquires the hierarchical level f for a screen title in the concatenated string having the lowest display priority. In S2646 the CPU 11 omits (deletes) the screen title having the lowest display priority from the concatenated string. When a plurality of screen titles having the lowest display priority are included in the concatenated string, the CPU 11 removes, among the plurality of screen titles, the screen title for the screen positioned closest to the menu screen side with respect to the screen navigation path from the screen titles constituting the concatenated string.

While the invention has been described in detail with reference to the embodiments thereof, it would be apparent to those skilled in the art that various changes and modifications may be made therein without departing from the spirit of the invention.

For example, while the breadcrumbs are displayed in one line in the first, second, and third embodiment described above, the breadcrumbs may be displayed in multiple lines with line breaks therebetween. In this case, the predetermined width W compared with the display width Ws would be a value found by multiplying the horizontal width of the breadcrumbs display area 34b by the number of lines available for displaying the breadcrumbs.

In the first, second, and third embodiment described above, the screen title for the currently displayed screen is not included in the breadcrumbs. That is, the end of the breadcrumbs includes the screen title of the screen belonging to a level one hierarchical level above the currently displayed screen. However, the screen title for the currently displayed screen may also be included at the end of the breadcrumbs and displayed therewith. For example, when the screen "TCP/IP" is displayed currently in accordance with the screen management table 12b, the CPU 11 may display the concatenated string "MENU>NETWORK>LAN>TCP/IP" on the breadcrumbs display area 34b.

In the first, second, and third embodiment described above, the MFP 1 determines whether the concatenated string fits within the breadcrumbs display area 34b based on the display width Ws expressing the horizontal length of the concatenated string after rasterization. However, the MFP 1 may be configured to determine whether the concatenated string fits within the breadcrumbs display area 34b based on the number of characters in the concatenated string.

In the first, second, and third embodiment described above, the menu screen serves as the first level screen, while a plurality of screen navigation paths branch off from the menu screen. However, the menu screen itself may be positioned in one of the plurality of screen navigation paths branching off a screen positioned one level higher.

The MFP 1 according to the second embodiment described above displays the omission separating character 46a to indicate that screen titles have been omitted, and the omission number 46b to indicate the number of omitted screen titles, but the present invention is not limited to this configuration. For example, the MFP 1 may use the omission separating character 46a alone without the omission number 46b to indicate both that screen titles have been omitted and the number of omitted screen titles. Specifically, the MFP 1 may be configured to display omission separating characters 46a in the breadcrumbs display area 34b of a number equivalent to the number of omitted screen titles. With this configuration, the user can understand that screen titles have been omitted and can determine the number of omitted screen titles based on the number of omission separating characters 46a. Hence, the user can see at a glance in what level the initial screen title displayed in the omission number 46b is positioned in the screen navigation path, even though screen titles have been omitted.

Figure 9:
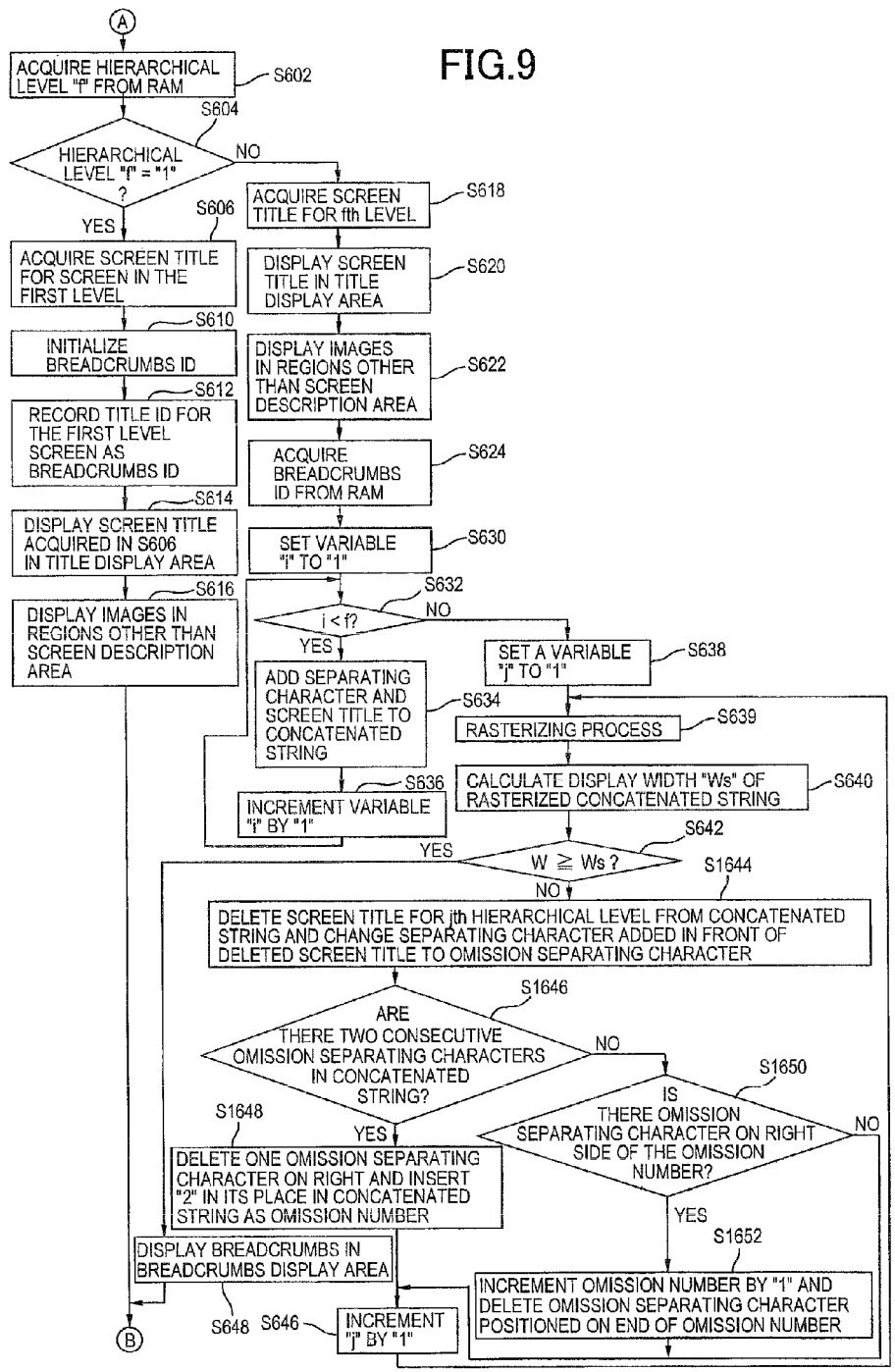
FIG. 9 is a flowchart illustrating steps in a part of a setup screen display process executed by the display device according to the second embodiment.

To implement this configuration, the flowchart for the setup screen display process shown in FIG. 9 may be modified by deleting steps S1646-S1652 so that the MFP 1 executes the process in S646 after performing S1644.

Alternatively, the MFP 1 according to the second embodiment described above may use the omission number 46*b* alone without the omission separating character 46*a* in order to indicate that screen titles have been omitted and to indicate the number of omitted screen titles. In this case, the omission number 46*b* may be displayed in the breadcrumbs display area 34*b* in a bolder font than the separating characters 42 so that the omission number 46*b* is more prominent than the separating characters 42. With this configuration, the user can recognize that screen titles have been omitted by the presence of the omission number 46*b*, which is very noticeable in its bold font, and can determine the number of omitted screen titles by the number indicated by the omission number 46*b*.

To implement this configuration, the flowchart for the setup screen display process shown in FIG. 9 is modified by deleting steps S1646-S1652 so that the MFP 1 executes step S646 immediately after S1644. The description of S1644 should also be modified to read "Delete (omit) the screen title in the $j^{th}$ level (hierarchical level f=j) from the concatenated string and delete the separating character 42 that was present in front of the deleted screen title. Next, add the value of the variable j to the concatenated string as the omission number 46*b* using a bolder font than the separating character 42."

The MFP 1 according to the second embodiment can also enable the user to recognize when screen titles have been omitted and to determine the number of omitted screen titles without using either of the omission separating character 46*a* or omission number 46*b*. The following configuration may be used to achieve this. When one screen title is omitted, the initial screen title in the breadcrumbs display area 34*b* is displayed in blue, for example. When a second screen title is omitted, the initial screen title is displayed in yellow, for example. When a third screen title is omitted, the initial screen title is displayed in red, for example. Hence, by changing the color of the initially displayed screen title based on the number of omitted screen titles, the user can recognize when a screen title has been omitted and can determine the number of omitted screen titles without requiring the omission separating character 46*a* and omission number 46*b*.

To implement this method, the flowchart for the setup screen display process in FIG. 9 may be modified by deleting steps S1646-S1652 so that the MFP 1 executes the process in S646 after S1644. Further, the description of S1644 is modified to "Delete (omit) the screen title in the $j^{th}$ level (hierarchical level f=j) from the concatenated string and delete the separating character 42 that was present in front of the deleted screen title." Next, steps are added between the modified S1644 and S646 for a process having the description "Acquire the value of the variable j" and a process having the description "Change the display color of the initial screen title in the concatenated string based on the value of the acquired variable j."

In the second embodiment described above, the MFP 1 uses an omission separating character 46*a* having a different format than the separating character 42. However, the omission separating character 46*a* may have the same shape as the separating character 42, provided that the omission separating character 46*a* is displayed in a larger or bolder font than the separating characters 42, for example. In this case, the separating character 42 added in front of the initial screen title may be omitted from the display in the breadcrumbs display area 34*b*.

In the third embodiment described above, the MFP 1 acquires predefined display priorities set in the screen management table 212*b*. However, the MFP 1 may be configured to dynamically create and acquire display priorities based on predetermined rules, such as (1) the display priority for each title screen is initially set to "1", (2) a "1" is added to the display priority of wizard start screens, and (3) a "1" is added to the display priority of screens belonging to the first and second hierarchical levels. Using these rules eliminates the need to store the priorities, thereby conserving memory.

In the third embodiment described above, only two values are defined in the screen management table 212*b* for display priorities: the high display priority "2" and the low display priority "1". However, one of three or more values may be assigned to each screen title as the display priority.

In the third embodiment described above, a larger number represents a higher display priority. However, values may be assigned so that a lower number represents a higher display priority. In this case, screen titles assigned display priorities having a larger value are screen titles with a lower display priority and thus are removed first from the concatenated string.

In the first, second, and third embodiment described above, the concatenated string includes the titles corresponding to all screen which are positioned in a part of the navigation path from menu screen to the current display screen. However, the concatenated string may include the titles each corresponding to a screen which is positioned at a part of the navigation path from the menu screen to the current display screen. For example, when the screen "TCP/IP" is displayed currently in accordance with the screen management table 12*b*, the CPU 11 may create the concatenated string "MENU>LAN>TCP/IP" excluding "NETWORK".

What is claimed is:
1. A display device comprising:
a display unit including a first portion and a second portion;
a first display control unit configured to display one of a plurality of screen images on the first portion, the plurality of screen images including a base screen image, the first display control unit changing a screen image to display from one to another of the plurality of screen images along a hierarchical screen navigation path starting from the base screen image;
a title string storing unit configured to store a plurality of title strings, each title string indicating one of the plurality of screen images;
a concatenated string creating unit configured to create a concatenated string including the title strings and separating characters alternately arranged, each title string corresponding to a screen image in an hierarchical position of the hierarchical screen navigation path from the base screen image to a current screen image that is displayed on the first portion currently;
a determining unit configured to determine whether or not the concatenated string is too large to be displayed entirely on the second portion;
a navigation string creating unit configured to create a navigation string by deleting at least one of the title strings from the concatenated string when the determining unit determines that the concatenated string is too large to be displayed entirely on the second portion,
a second display control unit configured to display the navigation string, including the title strings and the separating characters, on the second portion; and
a priority acquiring unit configured to acquire a priority value assigned to each title string of the plurality of title strings, the priority value being separate from the hierarchical position of each title string;
wherein the navigation string creating unit is configured to repeatedly delete the title strings one at a time based on the priority value until the determining unit determines that the concatenated string becomes small enough to be displayed entirely on the second portion, without deleting the separating characters from the displayed concatenated string,
wherein the navigation creating unit deletes title strings with the lowest priority values before deleting title strings with higher priority values; and
wherein, if at least two title strings are assigned with a lowest priority value, the navigation string creating unit deletes one of the at least two title strings based on the hierarchical position by deleting, the one of the at least two title strings indicating a screen image nearest a base screen image side of the navigation path among at least two screen images corresponding to the at least two title strings.

2. The display device according to claim 1, wherein the second display control unit is configured to display a number of separating characters indicating the number of deleted title strings.

3. The display device according to claim 1, wherein the first display control unit includes:
a first changing unit configured to change the screen image along the screen navigation path in a first direction away from the base screen image; and
a second changing unit configured to change the screen image along the screen navigation path in a second direction toward the base screen image.

4. The display device according to claim 3, wherein the concatenated string creating unit is configured to create the concatenated string each time one of the first changing unit and the second changing unit changes the screen image.

5. The display device according to claim 1,
wherein the second display control unit is configured to display in front of the navigation string, a number of separating characters corresponding to a number of the deleted title strings.

6. The display device according to claim 1, further comprising:
a rasterizing unit configured to rasterize the concatenated string; and
a calculating unit configured to calculate a display width corresponding to a length of the rasterized concatenated string in a longitudinal direction of the concatenated string;
wherein the determining unit is configured to determine that the concatenated string is small enough to be displayed entirely on the second portion when the display width is smaller than or equal to a predetermined width.

7. The display device according to claim 1, wherein the second display control unit is configured to display the concatenated string on the second portion when the determining unit determines that the concatenated string is small enough to be displayed entirely on the second portion.

8. A method comprising:
displaying one of a plurality of screen images on a first portion of a display unit, the plurality of screen images including a base screen image, the display unit including the first portion and a second portion;
changing a screen image to display from one to another of a plurality of screen images along a hierarchical screen navigation path starting from the base screen image;
creating a concatenated string including title strings and separating characters alternately arranged, each title string corresponding to a screen image in an hierarchical position of the hierarchical screen navigation path from the base screen image to a current screen image that is displayed on the first portion currently, each title string indicating one of the plurality of screen images;
determining whether or not the concatenated string is too large to be displayed entirely on the second portion;
creating a navigation string by deleting at least one of the title strings from the concatenated string when the determining step determines that the concatenated string is too large to be displayed entirely on the second portion;
displaying the navigation string including the title strings and the separating characters, on the second portion;
acquiring a priority value assigned to each of the plurality of title strings, the priority value being separate from the hierarchical position of each title string; and
repeatedly delete the title strings one at a time based on the priority value until the determining unit determines that the concatenated string becomes small enough to be displayed entirely on the second portion, without deleting the separating characters from the displayed concatenated string;
wherein the navigation creating unit deletes title strings with the lowest priority values before deleting title strings with higher priority values; and
wherein, if at least two title strings are assigned with a lowest priority value, deleting one of the at least two title strings based on the hierarchical position by deleting the one of the at least two title strings indicating a screen image nearest a base screen image side of the navigation path among at least two screen images corresponding to the at least two title strings.

9. A non-transitory computer-readable recording medium that stores a display control program, the display control program comprising instructions for:
displaying one of a plurality of screen images on a first portion of a display unit, the plurality of screen images including a base screen image, the display unit including the first portion and a second portion;
changing a screen image to display from one to another of a plurality of screen images along a hierarchical screen navigation path starting from the base screen image;
creating a concatenated string including title strings and separating characters alternately arranged, each title string corresponding to a screen image in an hierarchical position of the hierarchical screen navigation path from the base screen image to a current screen image that is displayed on the first portion currently, each title string indicating one of the plurality of screen images;
determining whether or not the concatenated string is too large to be displayed entirely on the second portion;
creating a navigation string by deleting at least one of the title strings from the concatenated string when the determining step determines that the concatenated string is too large to be displayed entirely on the second portion;
displaying the navigation string including the title strings and the separating characters, on the second portion;
acquiring a priority value assigned to each of the plurality of title strings, the priority value being separate from the hierarchical position of each title string; and
repeatedly delete the title strings one at a time based on the priority value until the determining unit determines that the concatenated string becomes small enough to be displayed entirely on the second portion, without deleting the separating characters from the displayed concatenated string;

wherein the navigation creating unit deletes title strings with the lowest priority values before deleting title strings with higher priority values; and wherein, if at least two title strings are assigned with a lowest priority value, deleting one of the at least two title strings based on the hierarchical position by deleting the one of the at least two title strings indicating a screen image nearest a base screen image side of the navigation path among at least two screen images corresponding to the at least two title strings.

* * * * *